United States Patent
Takai

(10) Patent No.: US 9,336,464 B2
(45) Date of Patent: May 10, 2016

(54) OPERATION DEVICE AND OPERATION METHOD FOR SHOWING PREVIEW IMAGES REFLECTING CHANGED SETTINGS

(71) Applicant: KYOCERA Document Solutions Inc.

(72) Inventor: Kenji Takai, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 13/898,504

(22) Filed: May 21, 2013

(65) Prior Publication Data

US 2013/0321837 A1    Dec. 5, 2013

(30) Foreign Application Priority Data

May 31, 2012    (JP) .................................. 2012-123982

(51) Int. Cl.
  *G06K 15/00*    (2006.01)
  *H04N 1/00*    (2006.01)

(52) U.S. Cl.
  CPC .......... *G06K 15/005* (2013.01); *H04N 1/00392* (2013.01); *H04N 1/00411* (2013.01); *H04N 1/00413* (2013.01); *H04N 1/00458* (2013.01); *H04N 1/00466* (2013.01); *H04N 1/00474* (2013.01)

(58) Field of Classification Search
  CPC .......................... H04N 1/00458; G06K 15/005
  USPC ................. 358/1.13, 1.15; 345/156, 204, 691
  See application file for complete search history.

(56) References Cited

U.S. PATENT DOCUMENTS

| | | |
|---|---|---|
| 2003/0011802 A1* | 1/2003 | Nakagiri et al. .............. 358/1.13 |
| 2006/0103877 A1* | 5/2006 | Lee et al. ...................... 358/1.15 |
| 2008/0252944 A1* | 10/2008 | Otsuka ............... H04N 1/00413 358/474 |
| 2010/0309512 A1 | 12/2010 | Onoda |
| 2012/0105886 A1 | 5/2012 | Takai et al. |
| 2012/0257225 A1* | 10/2012 | Fukaya ......................... 358/1.9 |

FOREIGN PATENT DOCUMENTS

| | | |
|---|---|---|
| EP | 1976259 A1 * 10/2008 | ............... H04N 1/00 |
| JP | 2001-113777 | 4/2001 |
| JP | 2001-337765 | 12/2001 |
| JP | 2003-69780 | 3/2003 |
| JP | 2003-087560 | 3/2003 |
| JP | 2003-296090 | 10/2003 |
| JP | 2004-326426 | 11/2004 |
| JP | 2006-146662 | 6/2006 |

(Continued)

*Primary Examiner* — Jacky X Zheng

(57) ABSTRACT

An operation device includes: a preview image displaying unit configured to display plural setting item keys and icons corresponding to setting items in a predetermined screen and display a preview image that resembles a printed matter corresponding to a setting value of a predetermined setting item upon changing the setting value; an obtaining unit configured to obtain setting values of either a setting item key among the setting item keys or an icon among the icons one by one when a user performs a predetermined operation to the setting item key or the icon; and a generating unit configured to generate preview images corresponding to respective ones of the obtained setting values. The preview image displaying unit is further configured to switch and display the generated preview images in the screen in turn with a predetermined time interval.

4 Claims, 16 Drawing Sheets

(56) References Cited

FOREIGN PATENT DOCUMENTS

| | | |
|---|---|---|
| JP | 2007-72919 | 3/2007 |
| JP | 2007-150556 | 6/2007 |
| JP | 2007-288330 | 11/2007 |
| JP | 2008-251046 | 10/2008 |
| JP | 2010-154036 | 7/2010 |
| JP | 2010-217324 | 9/2010 |
| JP | 2011-18309 | 1/2011 |
| JP | 2011-170574 | 9/2011 |
| JP | 2011-257871 | 12/2011 |
| JP | 2012-95139 | 5/2012 |

* cited by examiner

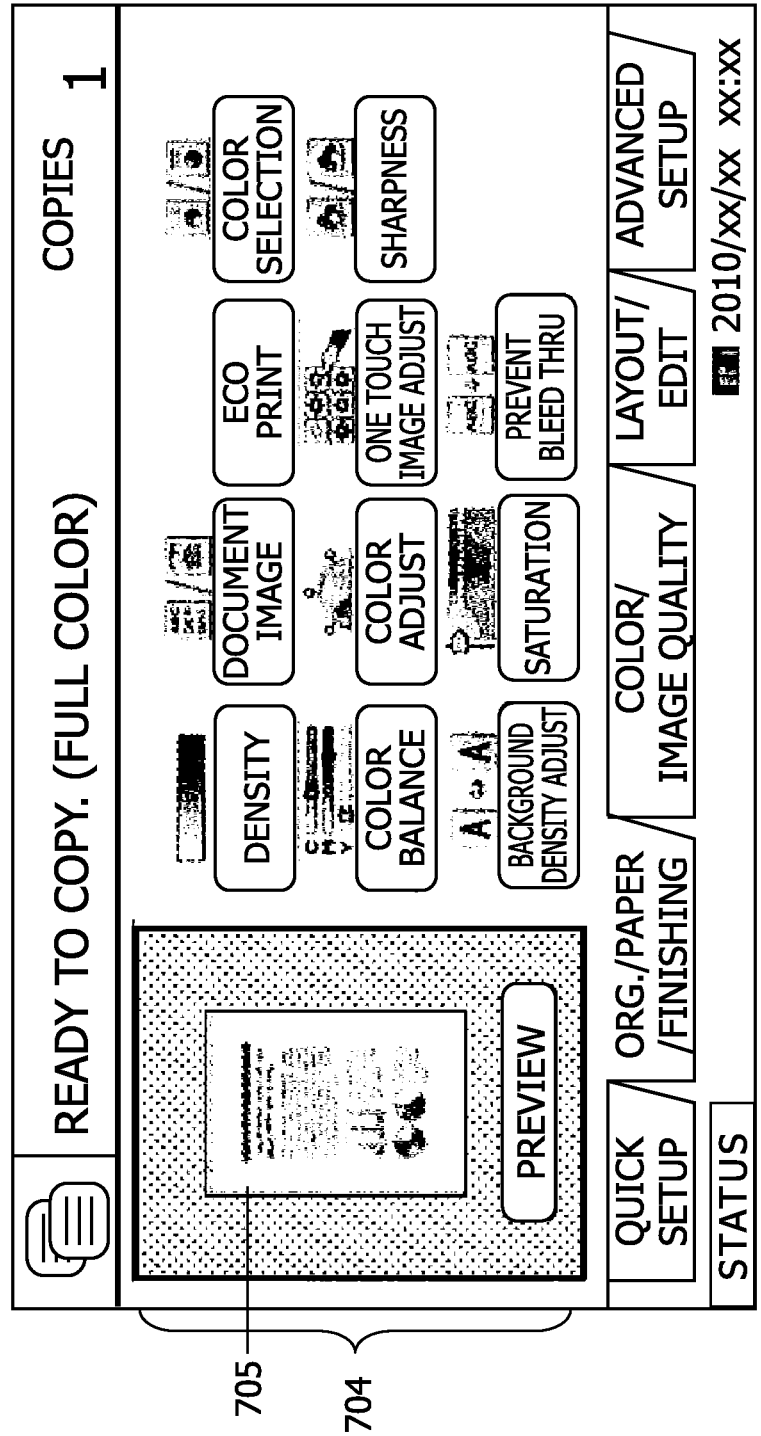

FIG. 8A

| SETTING ITEM | SETTING VALUE | | | | | |
|---|---|---|---|---|---|---|
| ... | | | | | | |
| COLOR SELECTION | FULL COLOR | MONOCHROME | MAGENTA | CYAN | YELLOW | |
| DENSITY | 1 | 2 | 3 | 4 | 5 | 6 | 7 |
| ... | | | | | | |

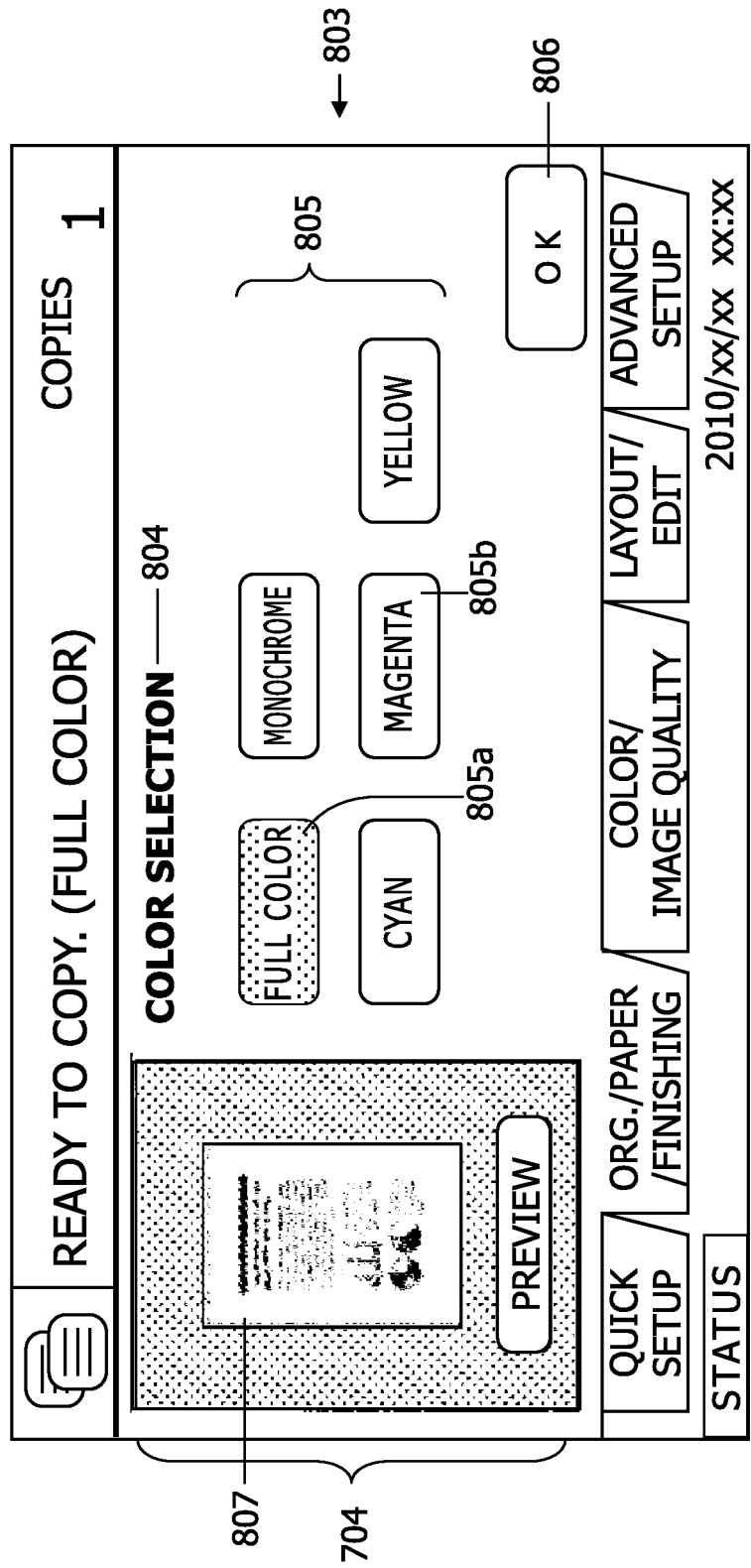

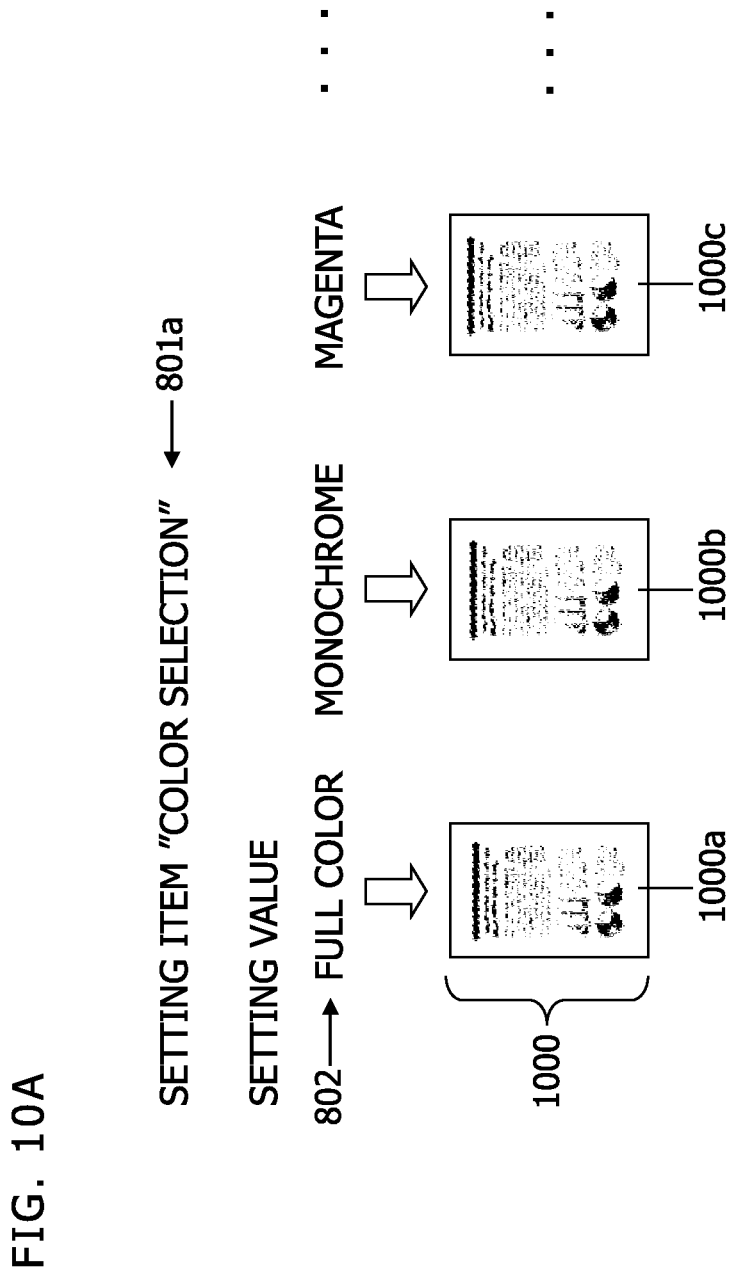

OPERATION DEVICE AND OPERATION METHOD FOR SHOWING PREVIEW IMAGES REFLECTING CHANGED SETTINGS

CROSS-REFERENCE TO RELATED APPLICATIONS

This application relates to and claims priority rights from a Japanese Patent Application No. 2012-123982, filed on May 31, 2012, the entire disclosures of which are hereby incorporated by reference herein.

BACKGROUND

1. Field of the Invention

The present disclosure relates to an operation device, an operation method, and an image forming apparatus including an operation device.

2. Description of the Related Art

A method for instruction of printing out on application software is (a) performing a print instruction while a file (data) is opened on the application software and subsequently opening a property of a printer, and (b) causing to perform an output process after an instruction of a print condition such as duplex printing, dual page printing, on/off of a staple process, number of printing copies, if necessary.

As mentioned, in general, when performing print instruction for a target file, the target file must be opened on application software. Therefore, since a target file must be opened on application software every time, operability is bad and it takes a lot of time for setting the print condition.

To solve such a problem, in a print operation system, on a display screen in which a print icon corresponding to a preset print condition and an icon of a file to be printed are displayed, dragging the file icon and dropping it onto the print icon causes to perform a print process for the file under the preset condition corresponding to the print icon. In this print operation system, this print icon is displayed on the display screen in a manner to enable a user to recognize the preset print condition corresponding to the print icon. It is described that therefore without opening a file on application software, a drag and drop operation can cause to perform printing under an often-used print condition.

An electrophotography image system includes an operation panel unit which acts as an operation interface part for inputting/outputting operation instruction for an operator; a panel control unit which controls the operation panel unit; and an external medium inputting/outputting unit which acts as an input/output interface for an external medium which stores layout information on a photo image, frame data in which layout information on a photo image, an attached image to be composed and arranged and layout information on the attached image, or a photo image. This electrophotography image system also includes an external medium control unit which controls the external medium inputting/outputting unit; and an image processing control unit which performs, in accordance with an operation instruction from the operation panel, image processing on the basis of a photo image in an external medium or frame data stored in an external medium or frame data stored in an internal ROM or frame data downloaded to an internal RAM. This electrophotography image system also includes an image printing unit which perform a print process of a processed image; a printing control unit which controls the image printing unit; an image displaying unit which performs a display process of the processed image; and a display control unit which controls the image display unit; and includes an attachment image file as a small-size part image, and plural pieces of the frame data shares and refers to the part image. It is described that therefore a data amount of the frame data is small and it is possible to provide an electrophotography image system including an interface with excellent operability.

Further, an image forming apparatus includes an image data inputting unit which inputs image data of an image to be formed; an image data storage unit which stores the image data; an image forming unit which forms an image on a paper sheet on the basis of the image data stored in the image data storage unit; a postprocessing unit which performs postprocessing for the paper sheet on which the image has been formed; and a postprocessing selecting unit which selects a type of postprocessing. This image forming apparatus also includes an image data reducing unit which converts the image data stored in the image data storage unit to image data with a reduced size; and a finish image displaying unit which edits the image data with the reduced size and displays a finish image which shows a status after postprocessing selected by the postprocessing selecting unit would be performed for a paper sheet on which an image has been formed on the basis of the image data with the reduced size. It is described that therefore it is possible to gain operability without wasting a paper sheet, toner and so forth due to an operation mistake or confirmation.

Furthermore, another image forming apparatus forms an image on a recording paper sheet on the basis of printing data and performs postprocessing for the recording paper sheet on which the image has been formed. This image forming apparatus includes a memory unit which stores plural pieces of postprocess image data which show expected finish images of a paper sheet after postprocessing for the paper sheet; and a setting unit which performs setting a postprocessing mode of the paper sheet and/or displaying a preview of the print data. The image forming apparatus also includes a control unit which reads out postprocess image data for the postprocessing mode set by the setting unit, combines the postprocess image data and print data based on the preview, and causes to display the combined image; and a display unit which displays as a preview the expected finish image which shows a postprocessed recording paper sheet, that is, generated as the combined image by the control unit. It is described that therefore it is possible to confirm a status of the postprocessed recording paper sheet before actual printing and to prevent a position of the postprocessing from being a wrong position different from a user's desired position.

Furthermore, a further other image forming apparatus includes an inputting unit which inputs image data of plural pages; a compressing unit which performs a compressing process of the image data inputted from the inputting unit; a storage unit which stores the image data; and a reducing unit which reduces the image data. This image forming apparatus also includes a storage control unit which stores image data of a predetermined page among the inputted plural pages in a non-compressed status into the storage unit and stores image data of the other pages in a compressed status into the storage unit; and a displaying unit which reads out the image data in non-compressed status stored in the storage unit, causes the reducing unit to reduce it and displays image of the reduced image data. It is described that therefore it is possible to immediately obtain an enlarged image corresponding to a reduced image in a displayed list without image quality deterioration.

Furthermore, an information processing apparatus performs setting on a display screen displayed by a display unit for a print function which prints print data with a printer machine. This information processing apparatus includes a first display control unit which displays a list of symbols indicating respective plural print functions in a first display area; a first selecting unit which selects a symbol in the list of the symbols displayed in the first display area; and a print function setting unit which performs setting for the plural print functions specified by the symbol selected by the first selecting unit. It is described that therefore it is possible to easily perform setting for the print functions of the printer machine when printing is performed with the printer machine on the basis of print data.

According to the aforementioned technique, when a user presses down a setting item key in a predetermined initial screen, a setting value input screen is displayed in which plural setting value keys of this setting item are displayed so as to enable them to be pressed down; when the user presses down the setting value key, a preview image corresponding to the change of the setting value is displayed in the initial screen; and the user somewhat recognizes effect of the setting value through the preview image.

However, for plural setting values of the setting item, the aforementioned technique is insufficient. For example, regarding a setting item for which only two setting values exist such as "duplex/single-sided printing" for which "duplex printing" and "single sided printing" exist, a user can easily recognize effect on a printed matter due to a predetermined setting value by performing one operation on the aforementioned setting value input screen. However, for example, regarding a setting item for which a lot of setting values exist such as "color setting" for which five setting values "full color", "black", "cyan", "magenta", and "yellow" exist, a user must repeatedly performs a key operation on the aforementioned setting value input screen in order to recognize effect on a printed matter due to respective these setting values.

SUMMARY

An operation device according to an aspect of the present disclosure includes: a preview image displaying unit configured to display plural setting item keys and icons corresponding to setting items in a predetermined screen and display a preview image that resembles a printed matter corresponding to a setting value of a predetermined setting item upon changing the setting value; an obtaining unit configured to obtain setting values of either a setting item key among the setting item keys or an icon among the icons one by one when a user performs a predetermined operation to the setting item key or the icon; and a generating unit configured to generate preview images corresponding to respective ones of the obtained setting values. The preview image displaying unit is further configured to switch and display the generated preview images in the screen in turn with a predetermined time interval.

An image forming apparatus according to an aspect of the present disclosure includes an operation device. The operation device comprises: a preview image displaying unit configured to display plural setting item keys and icons corresponding to setting items in a predetermined screen and display a preview image that resembles a printed matter corresponding to a setting value of a predetermined setting item upon changing the setting value; an obtaining unit configured to obtain setting values of either a setting item key among the setting item keys or an icon among the icons one by one when a user performs a predetermined operation to the setting item key or the icon; and a generating unit configured to generate preview images corresponding to respective ones of the obtained setting values. The preview image displaying unit is further configured to switch and display the generated preview images in the screen in turn with a predetermined time interval.

An operation method according to an aspect of the present disclosure includes the steps of: displaying plural setting item keys and icons corresponding to setting items in a predetermined screen, and displaying a preview image that resembles a printed matter corresponding to a setting value of a predetermined setting item upon changing the setting value; obtaining setting values of either a setting item key among the setting item keys or an icon among the icons one by one when a user performs a predetermined operation to the setting item key or the icon; generating preview images corresponding to respective ones of the obtained setting values; and switching and displaying the generated preview images in the screen in turn with a predetermined time interval.

These and other objects, features and advantages of the present invention will become more apparent upon reading of the following detailed description along with the accompanied drawings.

BRIEF DESCRIPTION OF THE DRAWINGS

FIG. 7B shows an example of an operation screen displayed on a touch panel in the embodiment of the present disclosure;

FIG. 8A shows an example of a setting-item-and-setting-value table in the embodiment of the present disclosure;

FIG. 8B shows an example of a setting value input screen displayed on a touch panel in the embodiment of the present disclosure.

FIG. 10A shows an example of a preview image in the embodiment of the present disclosure;

DETAILED DESCRIPTION

In the following part, referencing to the attached drawings, explained is an image forming apparatus including an embodiment of an operation device of the present disclosure. It should be noted that the following embodiment is an example and not intended to limit the present invention.

<Operation Device and Image Forming Apparatus>

In the following part, an image forming apparatus according to an embodiment of the present disclosure is explained.

Figure 1:
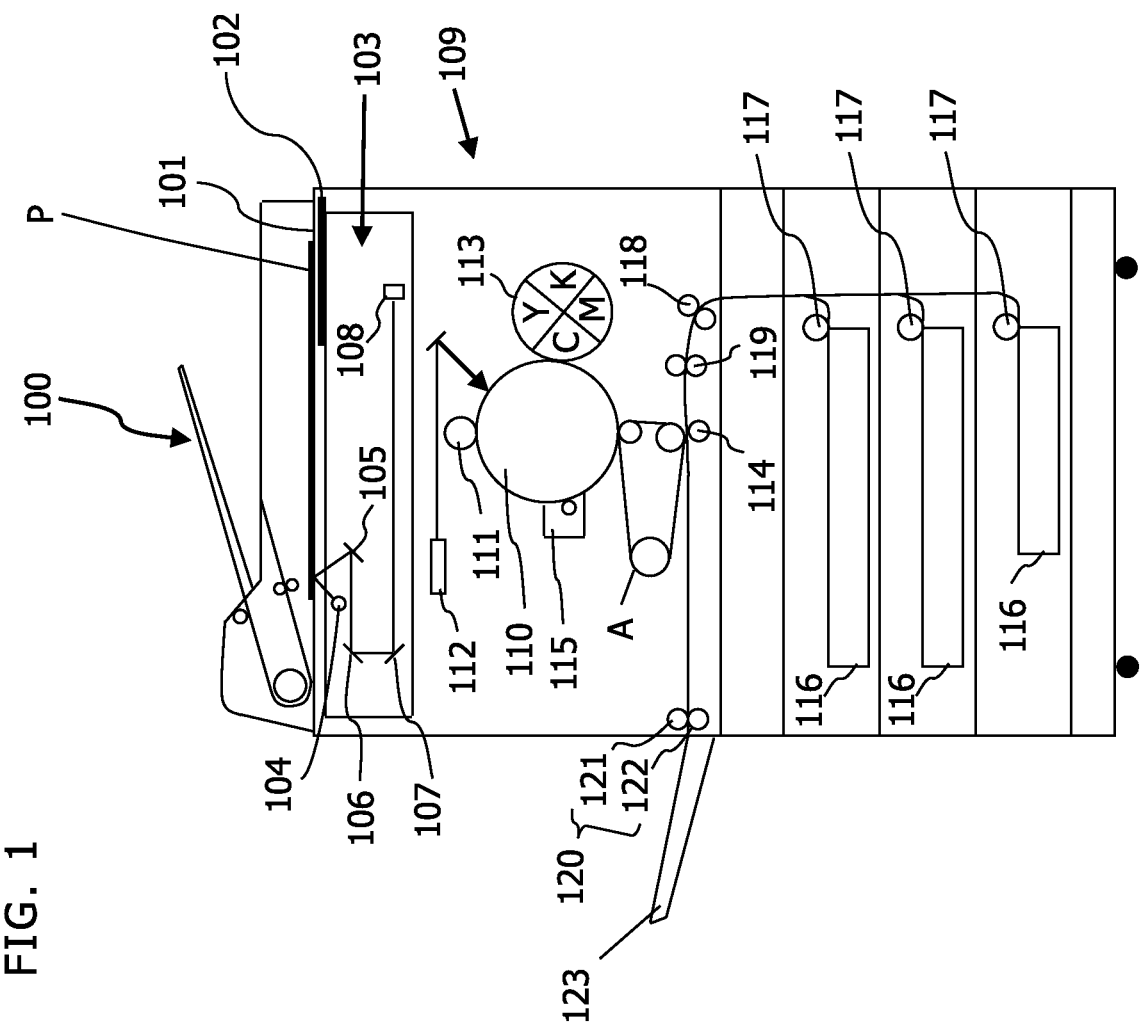
FIG. 1 shows a schematic diagram which indicates a whole internal configuration of a multifunction peripheral according to an embodiment of the present disclosure.

FIG. 1 shows a schematic diagram which indicates a whole internal configuration of a multifunction peripheral according to an embodiment of the present disclosure. This image forming apparatus is, for example, a printer, a scanner, a multifunction peripheral which includes a printer, a copier, a scanner, a facsimile and so forth, or the like, and has a copy function, a scanner function, a facsimile function, a printer function, and so forth. In the following part, when a user uses a copy function, an action of a multifunction peripheral (MFP) 100 is briefly explained.

Firstly, when a user uses the multifunction peripheral 100, the user puts a document P on a platen glass 101 or an auto document feeder unit, and inputs a setting of the copy function to an operation unit 102. This operation unit 102 displays a print screen (e.g. an initial screen) of the copy function provided by the multifunction peripheral 100, and plural setting item keys of the copy function which can be selected. The user inputs a setting condition of the copy function through the print screen.

After inputting the setting condition, the user presses a start key arranged in the operation unit 102 to start a process of the copy function in the multifunction peripheral 100.

After the multifunction peripheral 100 starts the process of the copy function, in an image scanning unit 103, light irradiated from a light source 104 reflects on a document put on the platen glass 101. The reflection light is guided to an image sensor element 108 by mirrors 105, 106 and 107. The guided light is converted to electric signals by an image sensor element 108, and image data (color image data) of the document is generated by performing basic processes such as a correction process, an image quality process, and a compression process for the electric signal. The guided light is converted to analog electric signals of R (Red), G (Green), and B (Blue), and analog-digital conversion is performed for the respective analog electric signals.

An image forming unit 109 is a driving unit which transfers an image based on the image data as a toner image. The image forming unit 109 includes a photo conductor drum 110. The photo conductor drum 110 rotates at a constant speed in a predetermined direction, and in periphery of it, devices and units are arranged such as a charging device 111, an exposure unit 112, a developing device 113, a transferring device 114, and a cleaning unit 115.

The charging device 111 uniformly charges a surface of the photo conductor drum 110. The exposure unit 112 forms an electrostatic latent image on the charged surface of the photo conductor drum 110 by irradiating a laser light based on the image data. The developing device 113 forms a toner image by attaching toner to the electrostatic latent image while it is moving. The formed toner image is transferred to a recording medium (e.g. a sheet) by the transferring device 114. The cleaning unit 115 removes residual unnecessary toner on the surface of the photo conductor drum 110. A series of these processes is performed while the photo conductor drum 110 is rotating.

In the image forming apparatus capable of processing a full color image, the developing device 113 (rotary developing device) is rotated around a rotation axis perpendicular to FIG. 1 in a circumferential direction, and developing units which store toner with respective colors are arranged so as to face the photo conductor drum 110. In this configuration, electrostatic latent images on the photo conductor drum 110 are developed with toner stored in the developing device 113, and the developed images are transferred to an intermediate transfer belt A.

The developing device 113 includes four developing units 113 (Y), (C), (M), and (K) which store toner of yellow (Y), cyan (C), magenta (M), and black (K). Transferring to the intermediate transfer belt A for respective these colors forms a full color image on the intermediate transfer belt A.

For performing printing, color (i.e. color information) included in the aforementioned image data (color image data) is changed (converted) from RGB to YMCK.

The aforementioned sheet is fed and transported from plural paper feed cassettes 116. To transport the sheet, the sheet is fed from any one of the paper feed cassettes 116 to a transportation path by a pickup roller 117. Sheets with different paper types are stored in the respective paper feed cassettes 116, and fed is a sheet with a paper type corresponding to a setting value in the aforementioned setting condition.

The sheet fed into the transportation path is transported inbetween the intermediate transfer belt A and the transferring device 114 by a transporting roller 118 and a registration roller 119. On the transferred sheet, a toner image is transferred by the transferring device 114, and then the sheet is transferred to a fuser device 120.

When the sheet on which the toner image has been transferred passes between a heating roller 121 and a pressuring roller 122 in the fuser device 120, heat and pressure are applied to the toner image, and consequently, the toner image is fixed on the sheet. An optimal heating value corresponding to the paper type is set to perform fixing properly. When the toner image is fixed on the sheet, the image forming is finished, and the sheet on which the toner image has been fixed is outputted through the fusing device 120 to an output tray 123, on which the sheet is piled and stored. In the aforementioned manner, the multifunction peripheral 100 provides the copy function to a user.

Figure 2:
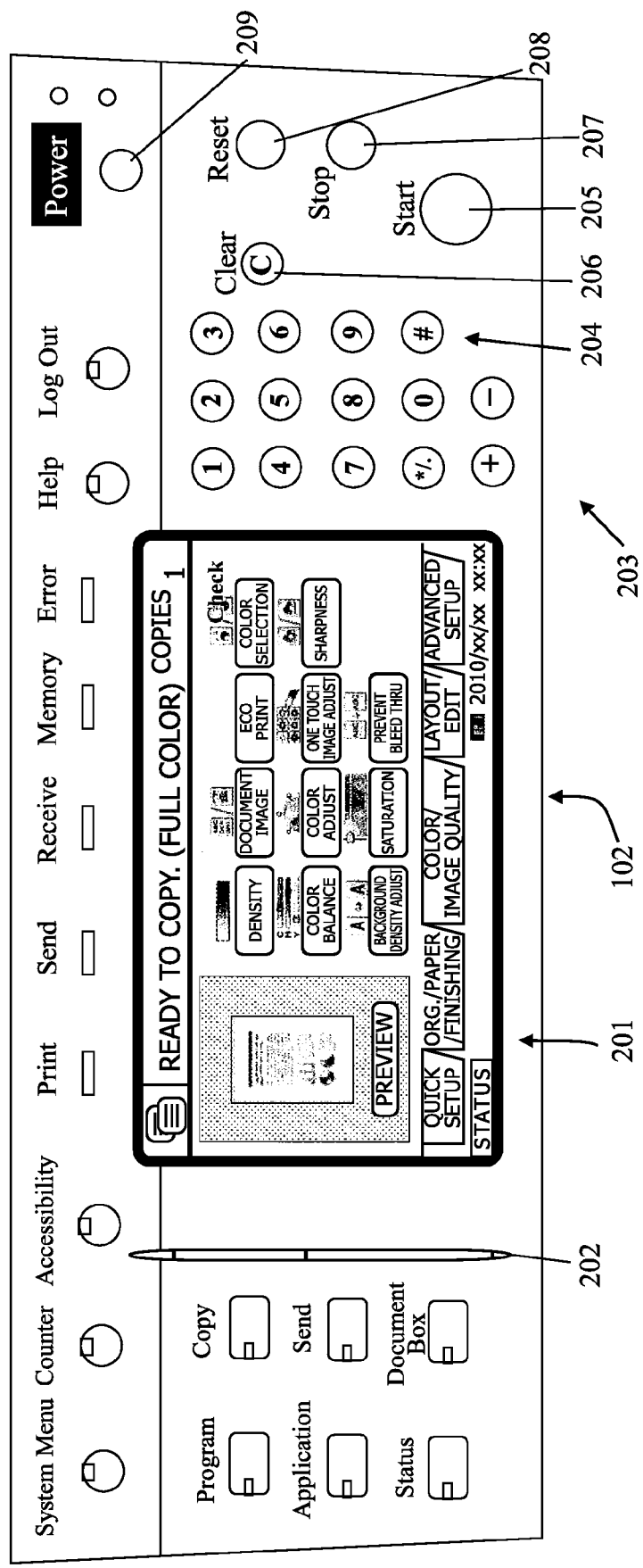
FIG. 2 shows a diagram which indicates a whole configuration of an operation unit according to the embodiment of the present disclosure.

FIG. 2 shows a diagram which indicates a whole configuration of an operation unit according to the embodiment of the present disclosure. A user uses an operation unit 102 to input a setting condition such as the aforementioned setting condition for image forming and to confirm the inputted setting condition. The operation unit 102 includes a touch panel 201 (an operation panel), a touch pen 202, and an operation key 203 which are used for a user to input a setting condition.

The touch panel 201 is one of an analog resistive type, and has a configuration in which a transparent upper film and a lower glass substrate are piled via a spacer, and transparent electrode layers made of ITO (indium Tin Oxide) or the like are formed on opposite surfaces of the upper film and the lower glass substrate. Further, it is configured so as to contact the transparent electrode layer of the upper film side to the transparent electrode layer of the lower glass substrate side at a pressed-down position when a user presses down the upper film. Under a condition that voltage is applied to the upper film and the lower glass substrate, detecting a voltage value at the pressed-down position from the upper film and the lower glass substrate identifies a coordinate value of the pressed-down position on the basis of the voltage value. If the identified pressed-down position is within a display area of a setting item key or the like in a screen displayed on the touch panel, then a setting value of the setting item key is inputted (is set).

Further, a display unit such as an LCD (Liquid Crystal Display) is arranged beneath the lower glass substrate, and when the display unit displays a screen such as an initial screen or a copy function screen, the screen is displayed on the touch panel 201. Therefore, the touch panel 201 has a function to input a setting condition and so forth, and a function to display the setting condition and so forth.

Further, the touch pen 202 is arranged near the touch panel 201. When a user contacts a tip of the touch pen 202 to the touch panel 201, a coordinate value of the contact position (i.e. the pressed-down position) is outputted. Therefore, the user presses down and selects a displayed setting item key or the like using the touch pen 202.

Further, the operation keys 203 are arranged near the touch panel 201, such as numeric keys 204, a start key 205, a clear key 206, a stop key 207, a reset key 208, and a power key 209.

Figure 3:
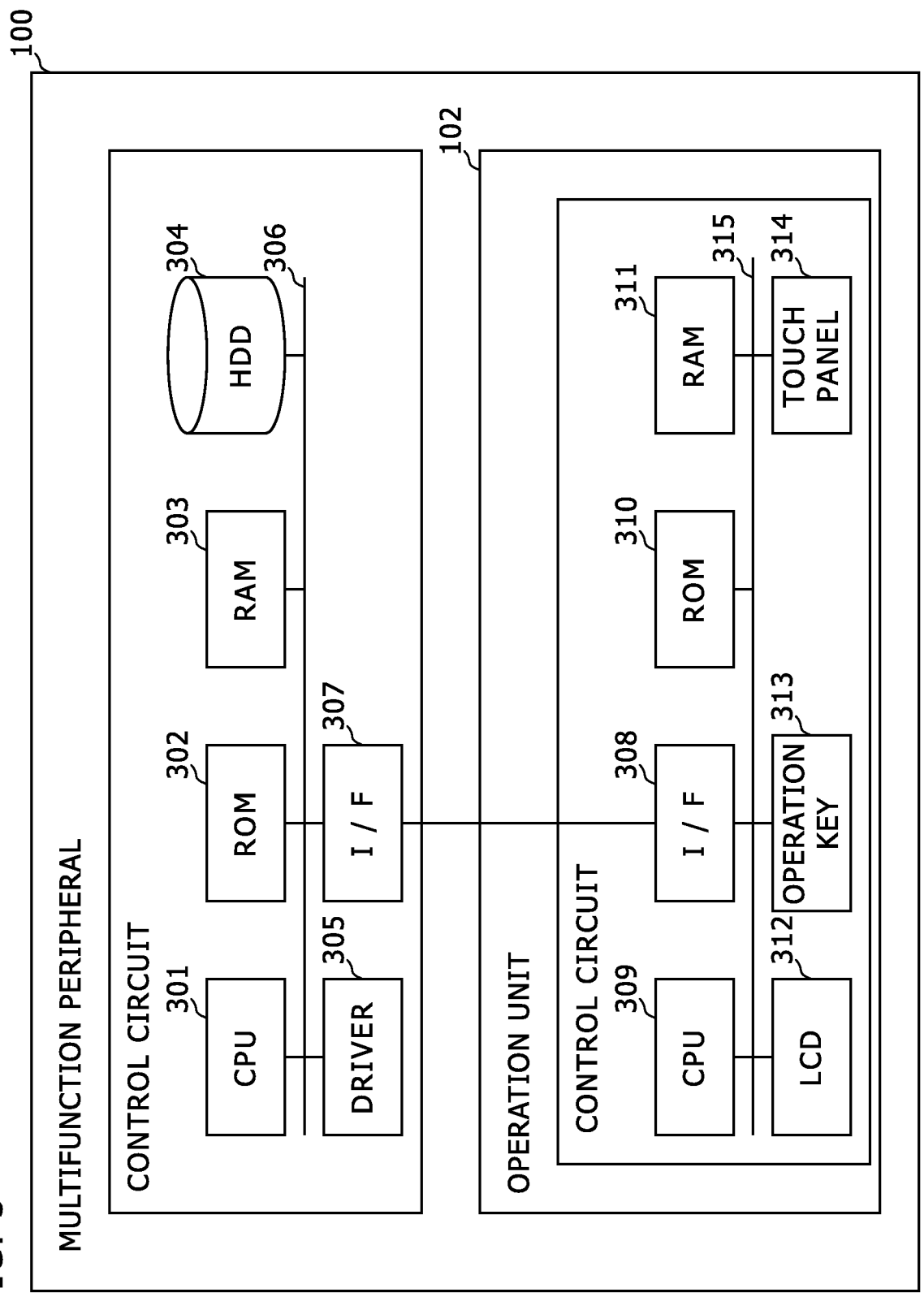
FIG. 3 shows a schematic diagram which indicates a hardware configuration of a control system in the multifunction peripheral and the operation unit according to the embodiment of the present disclosure.

In the next part, a configuration of a control system in the multifunction peripheral 100 and the operation unit 102 is explained. FIG. 3 shows a schematic diagram which indicates a hardware configuration of a control system in the multifunction peripheral 100 and the operation unit 102 according to the embodiment of the present disclosure.

In a control circuit of the multifunction peripheral 100, a CPU (Central Processing Unit) 301, a ROM (Read Only Memory) 302, a RAM (Random Access Memory) 303, an HDD (Hard Disk Drive) 304, and drivers 305 corresponding to respective driving units are connected via an internal bus 306. The CPU 301 uses the RAM 303, for example, as a work area, executes a program stored in the ROM 302, the HDD 304, or the like, transmits/receives data and instruction to/from the drivers 305 and the operation unit 102 on the basis of the execution, and controls actions of the driving units shown in FIG. 1. Further, other units mentioned below (shown in FIG. 4) than the driving units are also formed by execution of the program in the CPU 301.

Furthermore, an internal interface 307 is also connected to the internal bus 306 of the control circuit, and this internal interface 307 connects a control circuits and so forth in the operation unit 102 and the control circuit of the multifunction peripheral 100 to each other. Through the internal interface 307, the CPU 301 receives an instruction signal from the control circuit of the operation unit 102 and so forth, and transmits an instruction signal, data, and so forth to the control circuit of the operation unit 102 and so forth.

Furthermore, the control circuit of the operation unit 102 includes a CPU 309, a ROM 310, a RAM 311, an LCD 312, an operation key 313 (203), a touch panel 314 (201), and an internal interface 308 connected to an internal bus 315. When a user operates the operation key 313 or the touch panel 314, the CPU 309 transmits an instruction signal based on the operation to the control circuit of the multifunction peripheral 100 via the internal interface 308. Further, the CPU 309, the ROM 310, and the RAM 311 have the same function as the aforementioned ones, and units mentioned below (shown in FIG. 4) are also formed by the execution of the program in the CPU 309. In the ROM 310, a program and data to form the units mentioned below have been stored.

<Embodiment of the Present Disclosure>

Figure 4:
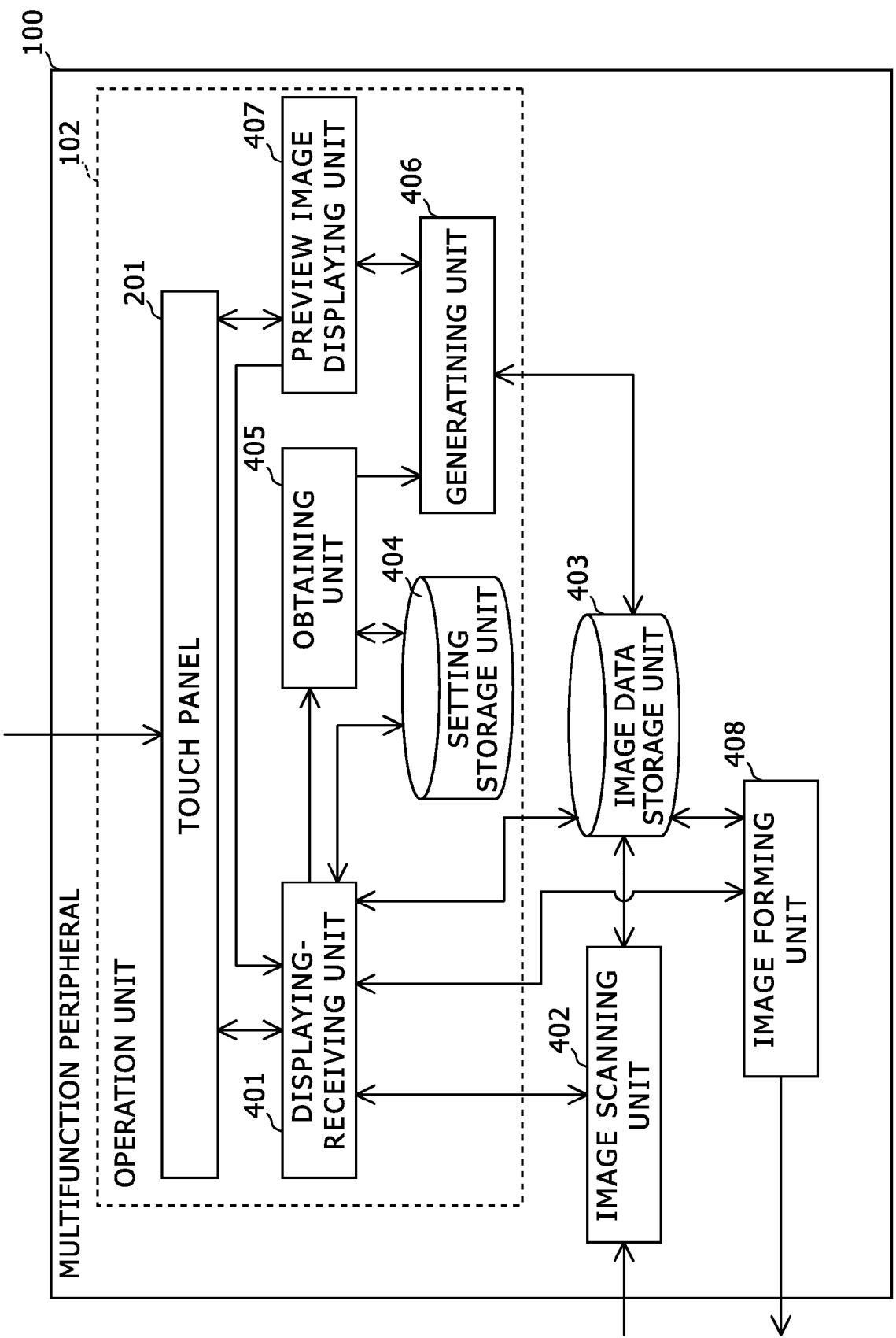
FIG. 4 shows a functional block diagram of the multifunction peripheral and the operation unit according to the embodiment of the present disclosure.
Figure 5:
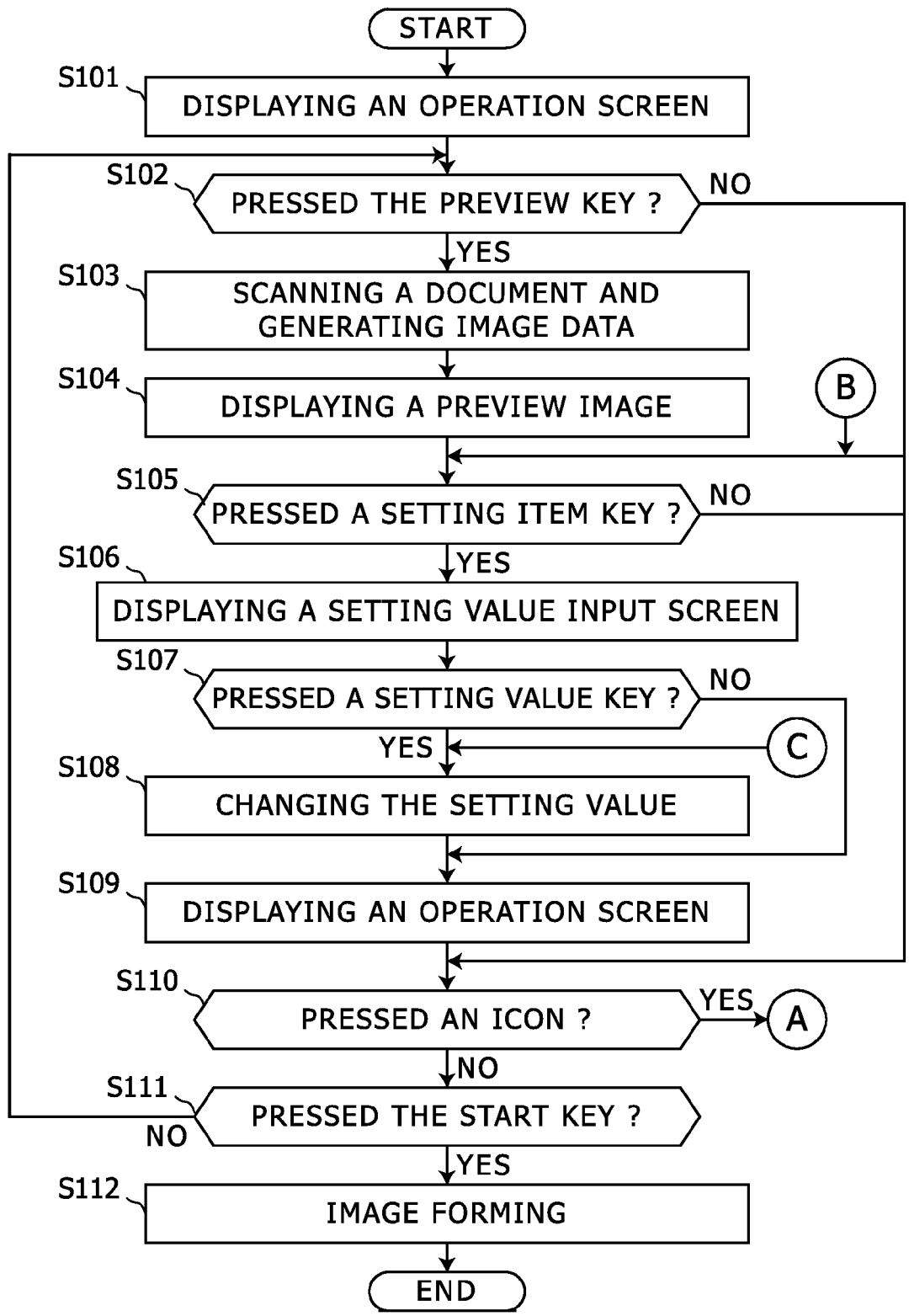
FIG. 5 shows a first flowchart which indicates execution procedures in the embodiment of the present disclosure.
Figure 6:
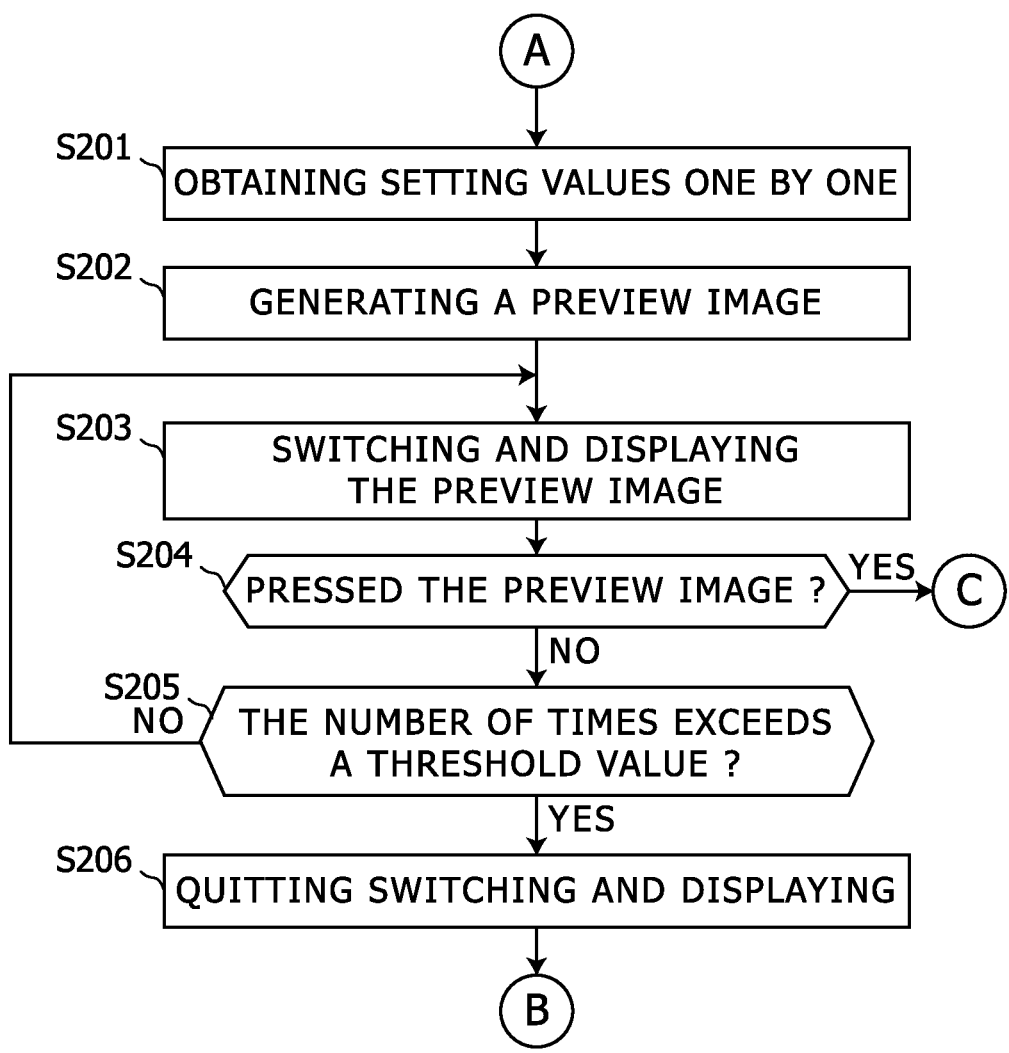
FIG. 6 shows a second flowchart which indicates execution procedures in the embodiment of the present disclosure.

Referencing to FIGS. 4 to 6, a configuration and execution procedures of the embodiment of the present disclosure are explained. FIG. 4 shows a functional block diagram of the multifunction peripheral and the operation unit according to the embodiment of the present disclosure. FIG. 5 and FIG. 6 show a flowchart which indicates execution procedures in the embodiment of the present disclosure.

First of all, when a user powers on the multifunction peripheral 100, the operation unit 102 is started up together with the multifunction peripheral 100, and a displaying-receiving unit 401 of the operation unit 102 obtains initial values of setting items in a setting condition of the copy function which has been stored in a predetermined memory in advance (e.g. a setting value "full color" for a setting item "color selection" and so forth), and sets them as an initial setting condition. Subsequently, the displaying-receiving unit 401 displays a preset operation screen (e.g. a copy function screen as an initial screen) based on the initial setting condition on the touch panel 201 (Step S101 in FIG. 5).

Figure 7A:
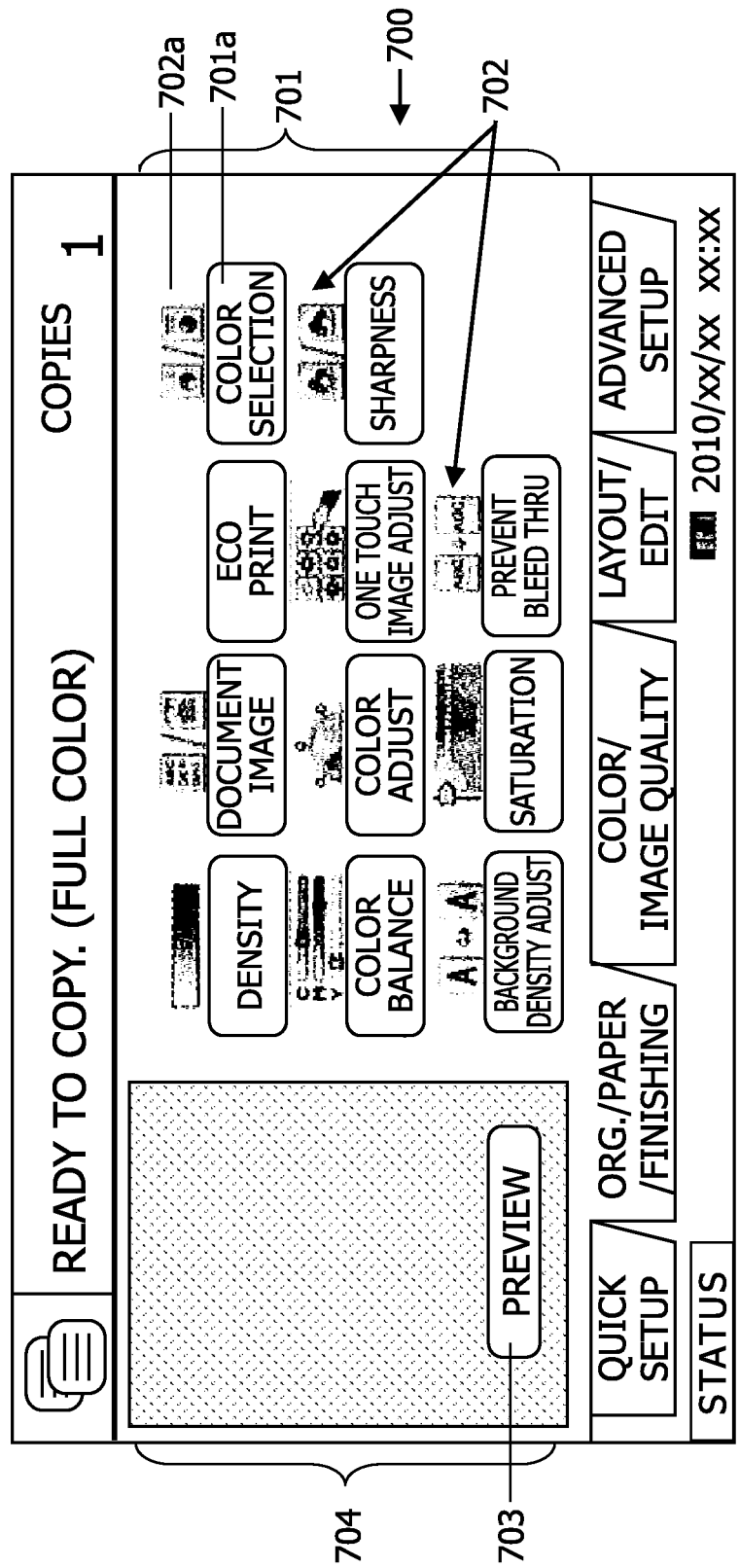
FIG. 7A shows an example of an operation screen displayed on a touch panel in the embodiment of the present disclosure.

In the operation screen 700, as shown in FIG. 7A, displayed are (a) setting item keys 701 to input a setting condition of a color function (e.g. "color selection" key 701a and so forth), (b) icons 702 which depict nature of setting items corresponding to the setting item keys 701 (e.g. an icon 702a of a full color document and a monochrome document for a setting item corresponding to "color selection" key 701a and so forth), and (c) "preview" key 703 to cause to read image data of a document P put on the platen glass 101 and display a preview image of the document P based on the image data. Further, a preview display area 704 is arranged above "preview" key 703, and is capable of displaying a preview image generated from image data of the document P on the platen glass 101.

Subsequently, if a user puts a document P on the platen glass 101 in an orientation (e.g. portrait orientation), and presses down "preview" key 703 in the operation screen 700 (YES at Step S102 in FIG. 5), then the displaying-receiving unit 401 receives the pressing-down operation to "preview" key 703, and informs it to the image scanning unit 402. Upon receiving it, the image scanning unit 402 reads image data from a document put on the platen glass 101 (Step S103 in FIG. 5), and stores the image data of the document in an image data storage unit 403.

After storing the image data of the document P in the image data storage unit 403, the image scanning unit 402 informs it to the displaying-receiving unit 401. Upon receiving it, the displaying-receiving unit 401 generates a preview image based on the image data of the document P.

As shown in FIG. 7B, the displaying-receiving unit 401 displays the generated preview image 705 in the preview display area 704 in the operation screen (Step S104 in FIG. 5).

If a user presses down "color selection" key 701a in the operation screen 700, then the displaying-receiving unit 401 receives the pressing-down operation to "color selection" key 701a (YES at Step S105 in FIG. 5), and refers to a setting-item-and-setting-value table which has been stored in the setting storage unit 404 in advance.

As shown in FIG. 8A, in the setting-item-and-setting-value table 800, a setting item 801 (e.g. "color selection" 801a or "density" 801b), and setting values 802 for the setting item 801 (e.g. "full color" 802a, "magenta" 802b and so forth for "color selection" 801a) are stored and related with each other.

Referring to the setting-item-and-setting-value table 800, the displaying-receiving unit 401 obtains all of the setting values 802 corresponding to "color selection" 801a, and switches from the operation screen 700 and displays a setting value input screen corresponding to "color selection" 801a using the obtained setting values 802 (Step S106 in FIG. 5).

As shown in FIG. 8B, in the setting value input screen 803, displayed are (a) a message 804 which indicates "color selection" 801a, (b) setting value keys 805 corresponding to "color selection" 801a (e.g. a "full color" key 805a, a "magenta" key 805b, and so forth), and (c) an OK key 806. Further, in the setting value input screen 803 as well as in the operation screen 700, the preview display area 704 is displayed, and in the preview display area 704, the preview image 705 (shown in FIG. 7B) corresponding to "full color" 802a is displayed. It should be noted that "full color" key 805a is set as an initial value in advance, and therefore, "full color" key 805a is displayed with a background color different from a background color of the other setting value keys among the setting value keys 805.

If a user presses down one of the setting value keys 805, for example, "magenta" key 805b, then the displaying-receiving unit 401 receives the pressing-down operation to "magenta" key 805b (YES at Step S107 in FIG. 5), generates a preview image corresponding to "magenta" 802b, and as shown in FIG. 8B, displays the generated preview image 807 in the preview display area 703 instead of the preview image 705 corresponding to "full color" 802a. Therefore, the user can confirm the change of the preview image due to the change of the setting value.

If the user presses down the OK key 806 while the user is looking at the setting value input screen 803, then the displaying-receiving unit 401 receives the pressing-down operation to the OK key 806, and changes a setting value of "color selection" 801a from "full color" 802a to "magenta" 802b (Step S108 in FIG. 5). Therefore, the user can input (set) a setting value of the predetermined setting item "color selection" 801a.

Figure 9A:
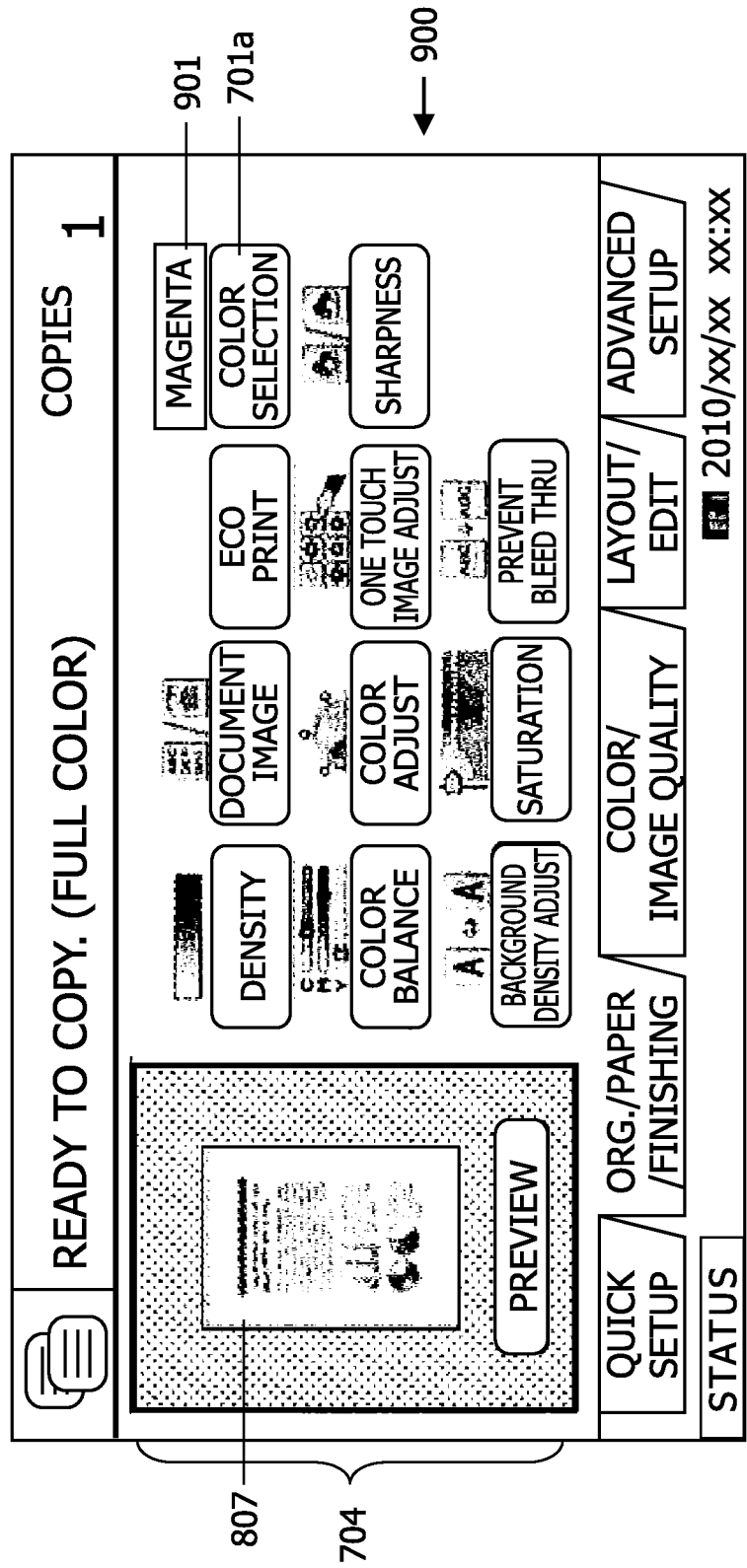
FIG. 9A shows an example of an operation screen displayed on a touch panel in the embodiment of the present disclosure.

Subsequently, the displaying-receiving unit 401 switches from the setting value input screen 803 to the operation screen 700 and displays the operation screen 700 (Step S109 in FIG. 5). As shown in FIG. 9A, in the operation screen 900, the preview image 807 corresponding to the setting value "magenta" 802b is displayed, and the changed setting value "magenta" 901 (802a) is displayed over the icon 702a of the setting item "color selection" of which the setting value was changed. Therefore, the user can visually confirm a change of a setting value of the predetermined setting item "color selection". Further, displaying the setting value "magenta" 901 prevents a user from pressing down the icon 702a corresponding to the setting item 801a for which the setting value has already been inputted (mentioned below).

If in Step S105 the user does not press down the setting item key 701 (NO at Step S105 in FIG. 5), and performs a predetermined operation to a predetermined key or icon, then the obtaining unit 405 mentioned below obtains setting values one by one corresponding to the operated key or icon.

The predetermined operation is, for example, an operation to simply press down an icon, an operation to continuously press down a predetermined key or icon, or an operation of double click on a predetermined key or icon. A case that the predetermined operation is an operation to simply press down an icon is explained below.

Figure 9B:
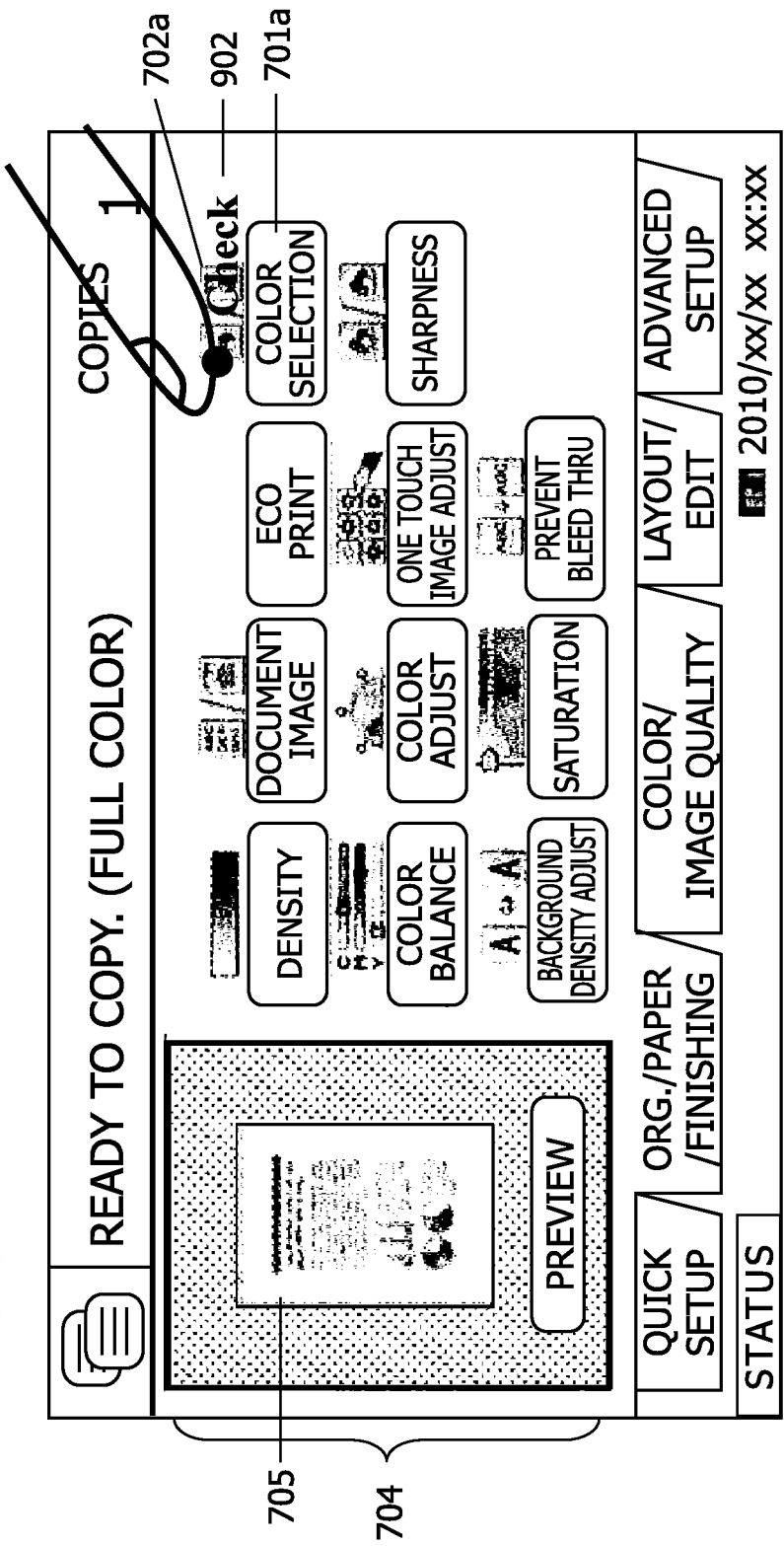
FIG. 9B shows an example of an operation screen displayed on a touch panel in the embodiment of the present disclosure.

As shown in FIG. 9B, if a user presses down the icon 702 corresponding to the setting item 801 (e.g. the icon 702a corresponding to "color selection" 801a), then the displaying-receiving unit 401 receives the pressing-down operation to the icon 702a (YES at Step S110 in FIG. 5), displays a mark "Check" 902 which indicates receipt of the pressing-down operation to the icon 702a over this icon 702a, and informs it to the obtaining unit 405. Upon receiving it, the obtaining unit 405 refers to the setting-item-and-setting-value table 800, and obtains the setting values 802 of the setting item 801 corresponding to the pressed-down icon 702 (e.g. "full color" 802a, "magenta" 802b, and so forth corresponding to "color selection" 801a) one by one (Step S201 in FIG. 6).

The obtaining unit 405 may obtain the setting values 802 of the setting item 801 one by one in any manner.

For example, if the number of the corresponding setting values 802 (e.g. the number of the setting values 802 of "color selection" 801a is 5) is less than a predetermined threshold value (e.g. 6), then the obtaining unit 405 serially obtains all of the setting values 802 of the setting item 801 from the first setting value "full color" through the intermediate setting value "magenta" to the last setting value "yellow".

On the other hand, if the number of the corresponding setting values 802 (e.g. the number of the setting values 802 of "density" 801b is 7) is equal to or larger than the predetermined threshold value (e.g. 6), then the obtaining unit 405 intermittently obtain setting values with an interval of a predetermined number (e.g. 2) of setting values, such as the first setting value "1", the third setting value "3", the fifth setting value "5", and the last setting value "7". Therefore, the number of setting values which the obtaining unit 405 obtains is limited on the basis of the number of setting values of the setting item, and consequently, it limits the number of times that preview images are switched and displayed as mentioned below.

Subsequently, upon finishing obtaining the setting values 802 of the setting item 801 one by one, the obtaining unit 405 informs it to the generating unit 406; and upon receiving it, the generating unit 406 generates preview images corresponding to the respective obtained setting values (Step S202 in FIG. 6).

For example, in case of the setting item "color selection" 801a, the generating unit 406 obtains image data of a document P from the image data storage unit 403, and as shown in FIG. 10A, generates preview images 1000 corresponding to the respective setting values "full color" 802a, "monochrome", "magenta" 802b, . . . obtained for "color selection" 801a.

Upon finishing generating the plural preview images, the generating unit 406 informs it to the preview image displaying unit 407; and upon receiving it, the preview image displaying unit 407 switches and displays the generated preview images in turn with a predetermined time interval (e.g. 1 seconds, 3 seconds, 5 seconds, 10 seconds, or 30 seconds) (Step S203 in FIG. 6).

Specifically, the preview image displaying unit 407 obtains a preview image 1000a corresponding to "full color" 802a from the generating unit 406, displays this preview image 1000a (705) in the preview display area 704 of the operation screen 700 so as to enable it to be pressed down, starts a timer provided in advance, and measures an elapsed time from the timing when starting to display the preview image 1000a.

Figure 10B:
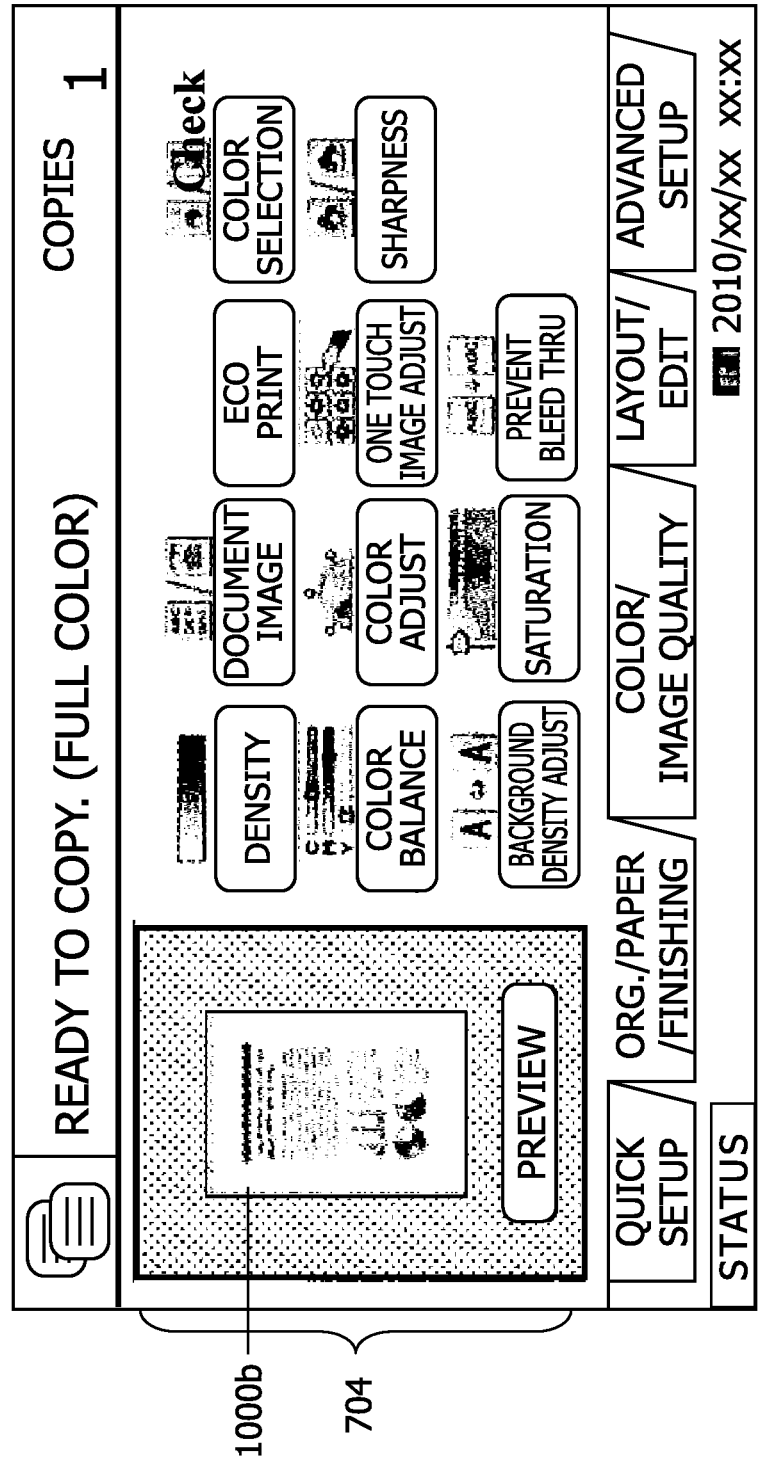
FIG. 10B shows an example of an operation screen displayed on a touch panel in the embodiment of the present disclosure.

Subsequently, when the elapsed time of the timer reaches a preset predetermined time (e.g. 5 seconds), the preview image displaying unit 407 obtains a next preview image, that is, a preview image 1000b corresponding to "monochrome", switches from the preview image 1000a to the preview image 1000b, displays the preview image 1000b as shown in FIG. 10B instead of the preview image 1000a corresponding to "full color" 802a, resets the timer, and measures an elapsed time from the timing when starting to display the preview image 1000b.

Figure 11A:
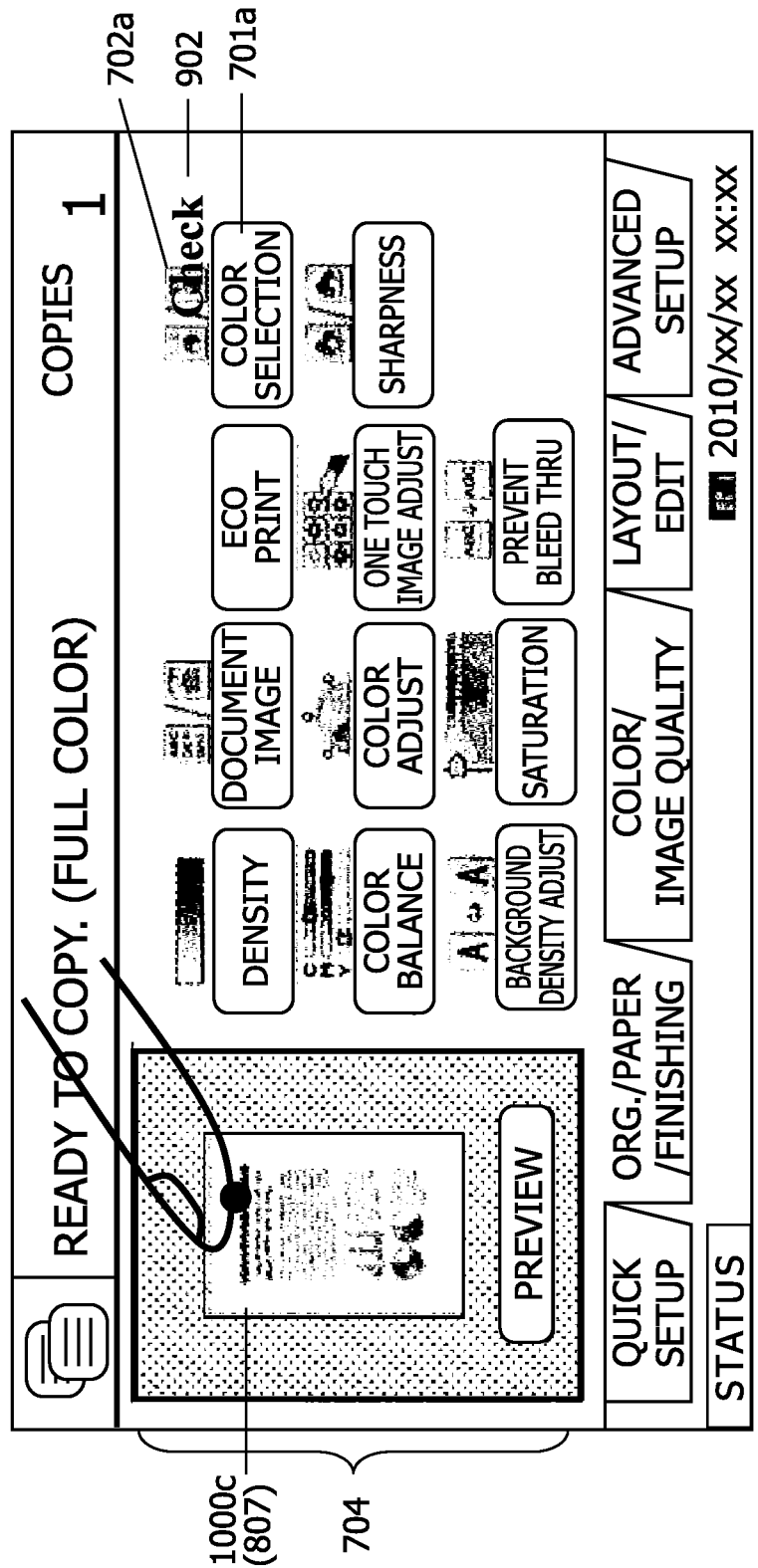
FIG. 11A shows an example of an operation screen displayed on a touch panel in the embodiment of the present disclosure.

Further, when the elapsed time of the timer reaches a preset predetermined time (e.g. 5 seconds), the preview image displaying unit 407 obtains a further next preview image, that is, a preview image 1000c corresponding to "magenta" 802b, switches from the preview image 1000b to the preview image 1000c, displays the preview image 1000c as shown in FIG. 11A instead of the preview image 1000b corresponding to "monochrome", resets the timer, and measures an elapsed time from the timing when starting to display the preview image 1000c.

As mentioned, the preview image displaying unit 407 repeatedly performs displaying a preview image 1000, measuring an elapsed time, and switching a preview image 1000 the same number of times as the number of the generated preview images 1000, namely, the number of the obtained setting values 802 of the setting item 801. Therefore, when a user visually confirms only the preview display area 704, the user can sufficiently confirm a change of a setting value of the setting item 801 corresponding to the firstly-pressed-down icon 702 and effect on a printed matter (i.e. the preview image 1000) due to the change.

In particular, when a user changes a setting value of a setting item 801 which a user has never used, if it is assumed that the user presses down a setting item key 701 to display a corresponding setting value input screen 803, presses down a setting value key 805, and visually confirms a change of a preview image in the preview display area 704, then the user must be required to cause to display the setting value input screen 803 and press down a setting value key 805 in order to confirm the change of the preview image, and these key operations bother the user.

In this embodiment, if the user presses down an icon 702 of a setting item 801, then plural preview images 1000 corresponding to setting values 802 of the setting item 801 are switched and displayed in turn; and therefore, the user can easily confirm a change of a setting values of the setting item 801 and effect on a printed matter due to the change thought the preview images 1000 without key operation burden. Consequently, it enhances user convenience.

Incidentally, if the user has not pressed down the preview images 1000 (NO at Step S204 in FIG. 6), then the preview image displaying unit 407 switches and displays all of the generated preview images 1000 in turn, counts up the number of times of displaying all of the generated preview images 1000 in turn when finishing displaying all of the generated preview images 1000 in turn, and determines whether or not the number of the counted-up times exceeds a predetermined threshold value (e.g. twice) (Step S205 in FIG. 6).

According to a result of the determination, if the number of the times does not exceed the threshold value (NO at Step S205 in FIG. 6), then return to Step S203, and the preview image displaying unit 407 performs switching and displaying the preview images 1000 again (Step S203 in FIG. 6). Since switching and displaying the preview images 1000 is performed with a predetermined time interval, even if a user omits confirming and/or pressing down a desired preview image 1000, the user can do it after the user waits until the desired preview image 1000 is displayed again.

On the contrary, according to the result of the determination, if the number of the times (e.g. 3 times) exceeds the threshold value (e.g. twice) (YES at Step S205 in FIG. 6), then the preview image displaying unit 407 quits switching and displaying the preview images 1000 (Step S206 in FIG. 6), deletes all of the generated preview images 1000, and informs it to the displaying-receiving unit 401. Upon receiving it, the displaying-receiving unit 401 deletes the mark 902 displayed over the icon 702a of the setting item "color selection", and returns to Step S105 and then displays the operation screen 700. Therefore, the user can press down a setting item key 701 in the operation screen 700 again.

Figure 11B:
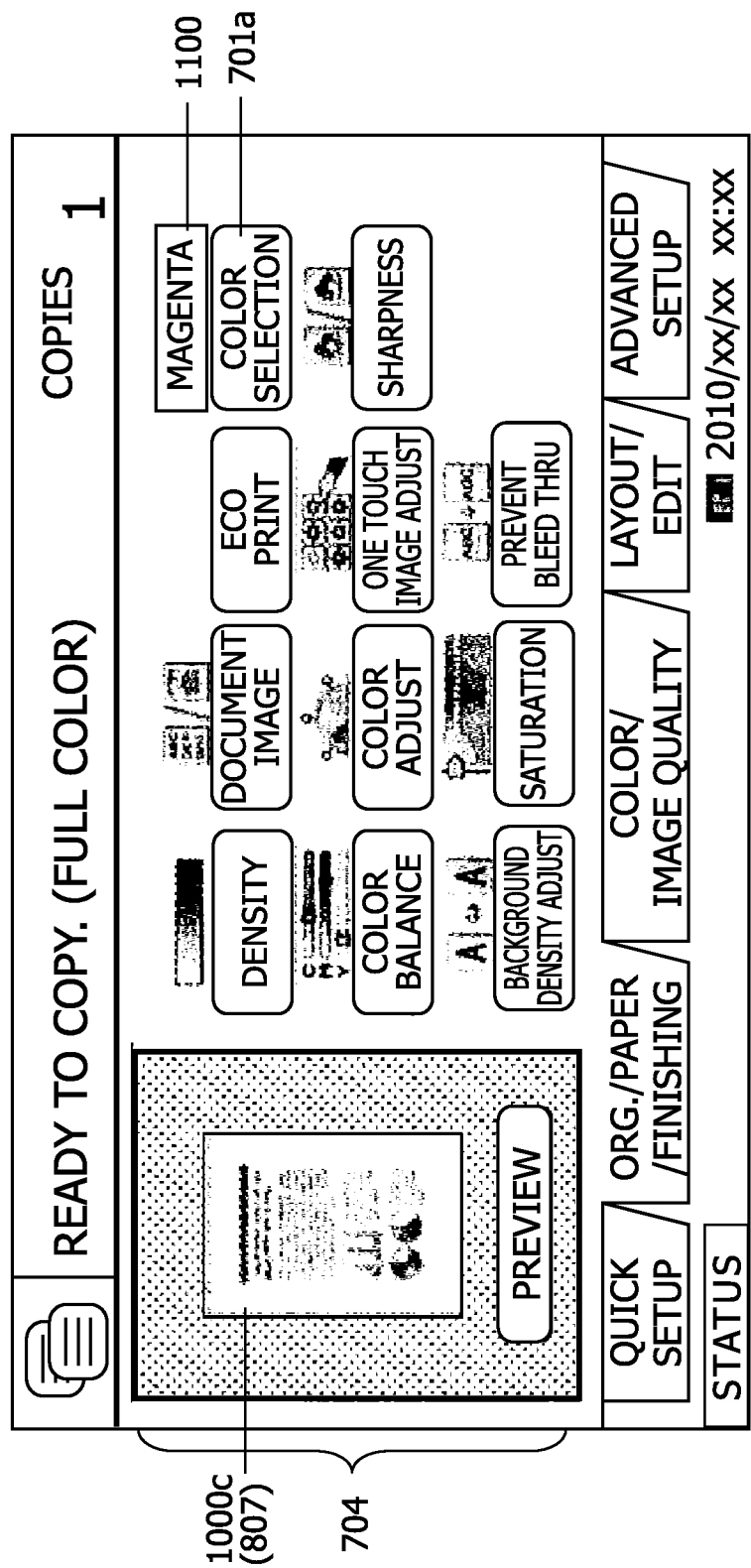
FIG. 11B shows an example of an operation screen displayed on a touch panel in the embodiment of the present disclosure.

Incidentally, in Step S203, if the user looks at the switched and displayed preview images 1000 in turn, visually confirms a preview image 1000 corresponding to a desired setting value among the setting values 802 (e.g. the preview image 1000c corresponding to "magenta" 802b), and presses down the confirmed preview image 1000c as shown in FIG. 11A, then the preview image displaying unit 407 receives the pressing-down operation to the preview image 1000c (YES at Step S204 in FIG. 6), and informs it to the displaying-receiving unit 401. Upon receiving it, the displaying-receiving unit 401 moves to Step S108, and changes a setting value corresponding to "color selection" 801a from "full color" 802a (i.e. a current setting value and initial value here) to "magenta" 802b (Step S108 in FIG. 5). Subsequently, as shown in FIG. 11B, the displaying-receiving unit 401 keeps displaying the preview image 1000c corresponding to the setting value "magenta" 802b, deletes the mark 902 displayed over the icon 702a of the setting item "color selection", and displays the changed setting value "magenta" 1100 (802b) over the icon 702a (Step S109 in FIG. 5). Therefore, a user can input or change a setting value by only pressing down a preview image 1000 corresponding to a desired setting value, and consequently, it is not necessary to perform an operation to display the setting value input screen 803, and user convenience is enhanced.

If a user presses down the start key 205 while the user is looking at the operation screen 700, then the displaying-receiving unit 401 receives the pressing-down operation to the start key 205 (YES at Step S111 in FIG. 5), and informs the pressing-down operation to the start key 205 and a setting condition (i.e. setting values of setting items) which has been received to the image forming unit 408. Upon receiving them, the image forming unit 408 obtains the image data of the document P by referring the image data storage unit 403, and forms an image of the document P on the paper sheet on the basis of the setting condition (Step S112 in FIG. 5).

Since the setting condition includes the setting value "magenta" 802b that a user inputs with a pressing-down operation, performing image forming produces a printed matter according to user's intention and the user can obtain the desired printed matter.

On the other hand, in Step S111, if the user has not pressed the start key 205 (NO at Step S111 in FIG. 5), then return to Step S102, the displaying-receiving unit 401 may receive a pressing-down operation to "preview" key (YES at Step S102 in FIG. 5), a pressing-down operation to a setting item key 701 (YES at Step S105 in FIG. 5), or a pressing-down operation to an icon 702 (YES at Step S110 in FIG. 5).

As mentioned, the operation unit 102 of this embodiment includes: the obtaining unit 405 which obtains setting values 802 of either a setting item key among the setting item keys 701 or an icon among the icons 702 one by one when a user performs a predetermined operation to the setting item key or the icon; the generating unit 406 which generates preview images 1000 corresponding to respective ones of the obtained setting values 802; and the preview image displaying unit 407 which switches and displays the generated preview images 1000 in the operation screen 700 in turn with a predetermined time interval.

Therefore, if a user presses down an icon 702 of a setting item 801, then the user can easily confirm a change of a setting value of the setting item 801 and effect on a printed matter due to the change without key operation burden. Thus, it is not necessary to perform an operation to display a setting value input screen 803 corresponding to a setting item and press down a setting value key in the setting value input screen 803 in an ordinary manner, and user convenience is enhanced.

In the operation unit 102 according to the embodiment of the present disclosure, the obtaining unit 405 is configured to obtain the setting values 802 which include a current setting value (an initial value) of the setting item 801 one by one.

Alternatively, the obtaining unit 405 may be configured to obtain setting values except for a current setting value (an initial value) among the setting values 802 one by one, because a preview image 705 corresponding to the current setting value has already been displayed in the preview display area 704. Therefore, the user can confirm only preview images which the user has not confirmed visually.

Further, in the operation unit 102 according to the embodiment of the present disclosure, the displaying-receiving unit 401 does not prohibit pressing down any other keys while the preview image displaying unit 407 is switching and displaying the preview images 1000 in turn with a predetermined time interval. Alternatively, for example, the operation unit 102 may be configured to prohibit receiving a pressing-down operation to any other icons 702 after pressing down a predetermined icon 702 until finishing a process corresponding to the pressing-down operation. In this case, while the preview image displaying unit 407 is switching and displaying the preview images 1000 corresponding to an icon 702 after a user firstly presses down the icon 702, the displaying-receiving unit 401 prohibits receiving a pressing-down operation to other icons 702; and even if the user further presses down another icon 702, the displaying-receiving unit 401 prohibits starting switching and displaying preview images corresponding to the pressed-down icon 702. Therefore, a series of the processes is smoothly performed without being complicated with another series of processes.

In the aforementioned case, for example, the displaying-receiving unit 401 is configured to prohibit receiving a pressing-down operation to another icon 702 while a predetermined mark 902 is displayed over an icon 702, and configured to receive a pressing-down operation to another icon 702 after deleting the mark 902.

Furthermore, in the operation unit 102 according to the embodiment of the present disclosure, the displaying-receiving unit 401 is configured to display a setting value 802 over an icon 702 corresponding to a setting item 801 when inputting (setting) the setting value 802 of the setting item 801 is finished in order to prohibit a pressing-down operation to this icon 702. Alternatively, the displaying-receiving unit 401 may be configured to display the setting value in another manner. For example, the displaying-receiving unit 401 may keep displaying the icon 702 and display the setting value 802 inside of the setting item key 701.

Furthermore, in the operation unit 102 according to the embodiment of the present disclosure, the aforementioned threshold value on the number of the setting values and the aforementioned threshold value on the number of the times may be changed on the basis of the number of the setting items, the number of setting values for the setting item, and so forth. Further, in the aforementioned embodiment, "color selection" 801a and "density" 801b are described as examples of the setting item 801 corresponding to the preview image 1000, but without limiting to these, another setting item may be used such as "document image", "eco print", "color balance", "color adjustment", "one touch image adjustment", "sharpness", "background density adjustment", "Saturation", and "Prevent Bleed Thru" shown in FIG. 7A, reversing, and so forth.

Furthermore, in the aforementioned embodiment of the present disclosure, the operation unit 102 is applied to the multifunction peripheral 100. Alternatively, this can be applied to other apparatuses which includes an operation unit (i.e. an operation device) having a touch panel, such as sorts of image forming apparatuses, sorts of image processing apparatuses, sorts of image editing apparatus, and sorts of image displaying apparatuses, in order to achieve the same actions and the same advantages.

Furthermore, in the aforementioned embodiment of the present disclosure, a program may be stored in a recording medium to form the aforementioned units in the operation unit 102 of the multifunction peripheral 100, and a configuration may be available in which the recording medium may be provided. In such a configuration, the operation unit 102 or the multifunction peripheral 100 reads out the program and forms the aforementioned units according to the program. In such a case, the program itself read out from the recording medium brings actions and advantages of the present disclosure. Further, it is possible to provide a method in which a step executed by the aforementioned unit is stored in a hard disk. In such a case, a central processing unit (CPU) in the operation unit 102 performs a control action together with each of circuits other than the CPU in accordance with a program. Further, the units formed with the program and the CPU may be configured of specific hardware. Further, this program can be circulated as a computer readable recording medium such as a CD-ROM in which the program has been recorded.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
an operation device;
wherein the operation device comprises:
   a preview image displaying unit configured to display plural setting item keys and icons corresponding to setting items in a predetermined screen and display a preview image that resembles a printed matter corresponding to a setting value of a predetermined setting item;
   an obtaining unit configured to obtain a plurality of setting values of either a setting item key among the setting item keys or an icon among the icons one by one when a user performs a predetermined operation to the setting item key or the icon; and
   a generating unit configured to generate a plurality of optional preview images from said preview image; each of the plurality of optional preview images corresponding to setting values obtained by the obtaining unit when the user performs the predetermined operation; and
the preview image displaying unit is further configured to switch and display each of said generated plurality of optional preview images in the screen in turn for a predetermined time period when the user performs said predetermined operation; wherein each of said generated plurality of optional preview images can be selected by the user while being displayed and
the preview image displaying unit is further configured to (a) stop the switching and displaying the preview images when the user selects one of the generated plurality of optional preview images and (b) change a setting value of the setting item corresponding to the icon to the setting value corresponding to the selected preview image when a user selects one of the generated plurality of optional preview image; wherein the changed setting value is used when printing the image.

2. The image forming apparatus according to claim 1, wherein:

the obtaining unit is further configured to obtain setting values of a setting item corresponding to a predetermined icon among the icons one by one when a user presses down the icon.

3. The image forming apparatus according to claim 1, wherein:

the obtaining unit is further configured to serially obtain all setting values of the setting item if the number of setting values of the setting item is less than a predetermined threshold value and intermittently obtain setting values with an interval of a predetermined number of setting values if the number of setting values of the setting item is either equal to or larger than the threshold value.

4. The image forming apparatus according to claim 1, wherein:

the preview image displaying unit is further configured to (a) repeatedly display all of the preview images in turn, (b) determine whether the number of times that all of the preview images are displayed in turn exceeds a predetermined threshold value, and (c1) display all of the preview images in turn again if the number of the times does not exceed the threshold value and (c2) quit switching and displaying the preview images if the number of the times exceeds the threshold value.

\* \* \* \* \*